United States Patent
Choi et al.

(10) Patent No.: US 9,889,408 B2
(45) Date of Patent: Feb. 13, 2018

(54) FILTER SYSTEM

(71) Applicant: LG ELECTRONICS INC., Seoul (KR)

(72) Inventors: Yuseung Choi, Seoul (KR); Junseok Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/317,903

(22) PCT Filed: Jul. 15, 2015

(86) PCT No.: PCT/KR2015/007336
§ 371 (c)(1),
(2) Date: Dec. 9, 2016

(87) PCT Pub. No.: WO2016/013797
PCT Pub. Date: Jan. 28, 2016

(65) Prior Publication Data
US 2017/0136418 A1 May 18, 2017

(30) Foreign Application Priority Data
Jul. 23, 2014 (KR) ........................ 10-2014-0093466

(51) Int. Cl.
*B01D 65/08* (2006.01)
*B01D 63/02* (2006.01)
(Continued)

(52) U.S. Cl.
CPC ............. *B01D 65/08* (2013.01); *B01D 63/02* (2013.01); *B01J 20/20* (2013.01); *B01J 20/2803* (2013.01);
(Continued)

(58) Field of Classification Search
CPC .......... B01D 65/08; B01D 63/02; B03C 5/02; C02F 1/001; C02F 1/283; C02F 1/44;
(Continued)

(56) References Cited

U.S. PATENT DOCUMENTS

2002/0011434 A1* 1/2002 Kuennen ................... A61L 2/10
210/97
2003/0222010 A1 12/2003 Bassett et al.
(Continued)

FOREIGN PATENT DOCUMENTS

| CN | 201132787 | 10/2008 |
|----|-----------|---------|
| CN | 101412550 | 4/2009 |
| JP | 2002-273122 | 9/2002 |

OTHER PUBLICATIONS

International Search Report and Written Opinion dated Nov. 11, 2015 issued in Application No. PCT/KR2015/007336 (Full English Text).

*Primary Examiner* — Walter D. Griffin
*Assistant Examiner* — Cameron J Allen
(74) *Attorney, Agent, or Firm* — KED & Associates, LLP

(57) ABSTRACT

A filter system comprises a hollow fiber membrane filter having pores; and an electrostatic adsorption filter partially or wholly having positive charges to be ion adsorbed with nanoparticles of negative charges by an electrostatic attraction, the nanoparticles which exist in the water, and the electrostatic adsorption filter configured to remove in advance the nanoparticles from the water to be supplied to the hollow fiber membrane filter, to prevent a water passing amount of the hollow fiber membrane filter from being rapidly reduced. According to the present invention, the viruses existing in raw water may be removed in accordance with a size exclusion mechanism of the hollow fiber membrane filter, and the nanoparticles, which cause the reduction (Continued)

of the water passing amount of the hollow fiber membrane filter, may be removed using the electrostatic adsorption filter.

10 Claims, 8 Drawing Sheets

(51) Int. Cl.
| | |
|---|---|
| *B03C 5/00* | (2006.01) |
| *B03C 5/02* | (2006.01) |
| *C02F 1/00* | (2006.01) |
| *C02F 1/28* | (2006.01) |
| *C02F 1/42* | (2006.01) |
| *C02F 1/44* | (2006.01) |
| *B01J 20/20* | (2006.01) |
| *B01J 20/28* | (2006.01) |
| *B01J 20/30* | (2006.01) |
| *B01J 41/02* | (2006.01) |
| *B01J 41/10* | (2006.01) |
| *C02F 101/12* | (2006.01) |
| *C02F 101/20* | (2006.01) |
| *C02F 101/30* | (2006.01) |

(52) U.S. Cl.
CPC ....... *B01J 20/3007* (2013.01); *B01J 20/3035* (2013.01); *B01J 20/3042* (2013.01); *B01J 41/02* (2013.01); *B01J 41/10* (2013.01); *B03C 5/00* (2013.01); *B03C 5/02* (2013.01); *C02F 1/001* (2013.01); *C02F 1/283* (2013.01); *C02F 1/42* (2013.01); *C02F 1/44* (2013.01); *B01D 2311/04* (2013.01); *B01D 2311/2603* (2013.01); *C02F 1/441* (2013.01); *C02F 2001/422* (2013.01); *C02F 2101/12* (2013.01); *C02F 2101/20* (2013.01); *C02F 2101/30* (2013.01); *C02F 2303/04* (2013.01)

(58) Field of Classification Search
CPC .............. C02F 2101/12; C02F 2101/20; C02F 2101/30; C02F 2303/04; B01J 41/02; B01J 41/10; B01J 20/20; B01J 20/2803; B01J 20/3042; B01J 20/3035; B01J 20/3007
See application file for complete search history.

(56) References Cited

U.S. PATENT DOCUMENTS

| | | | |
|---|---|---|---|
| 2009/0218274 A1* | 9/2009 | Sakashita | B01D 63/02 210/321.6 |
| 2010/0035751 A1 | 2/2010 | Perera et al. | |
| 2012/0125846 A1* | 5/2012 | Suzumura | B01D 61/14 210/637 |

* cited by examiner

[Fig. 1]
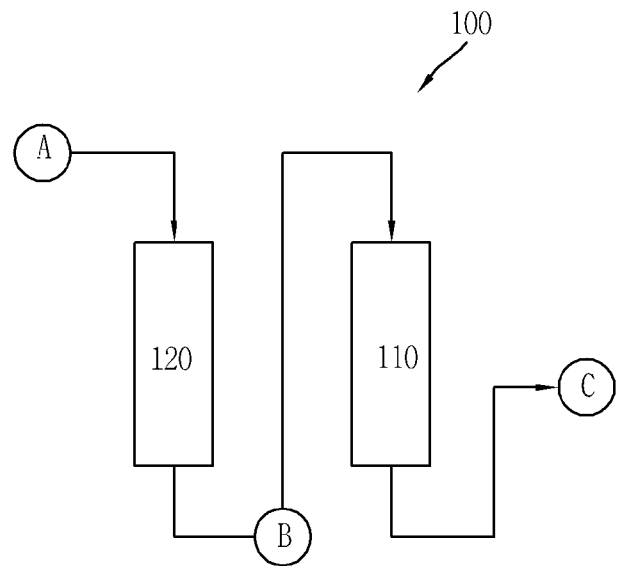
[Fig. 2a]
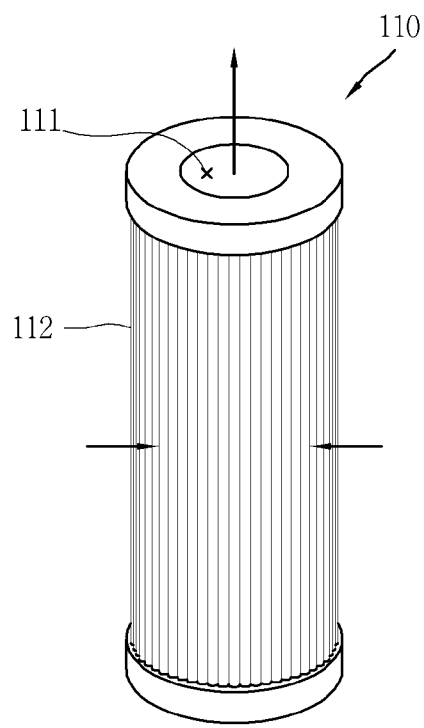

[Fig. 2b]
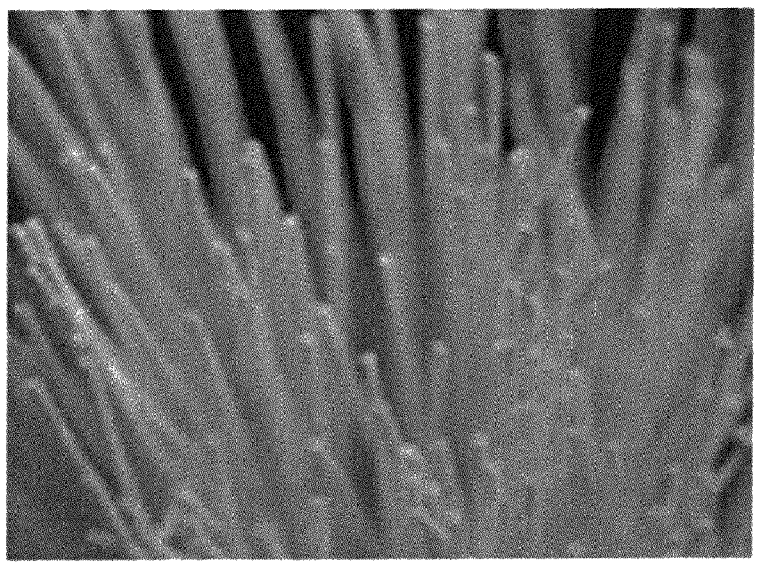
[Fig. 3a]
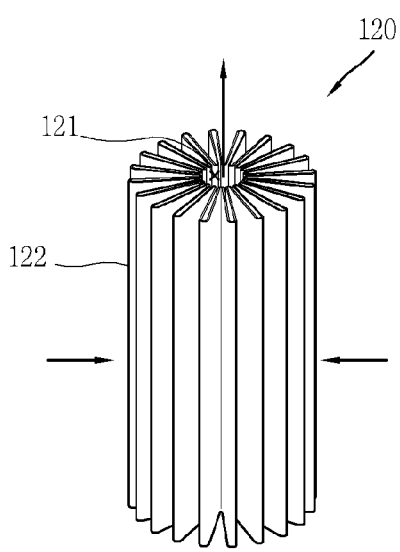
[Fig. 3b]
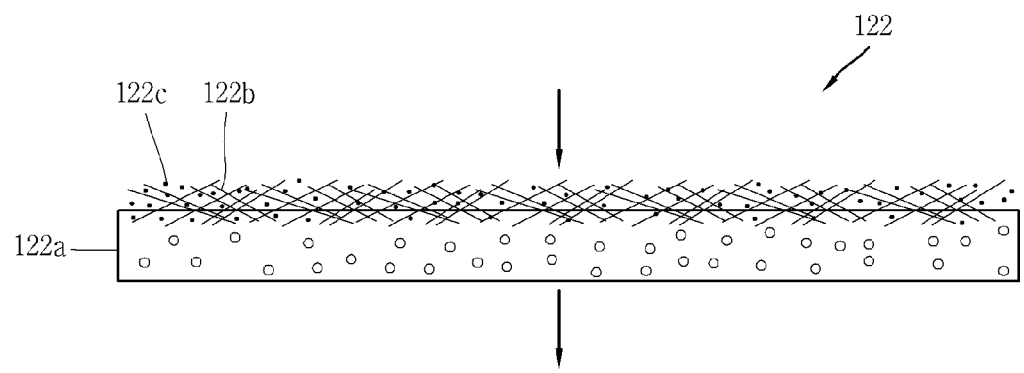

[Fig. 3c]
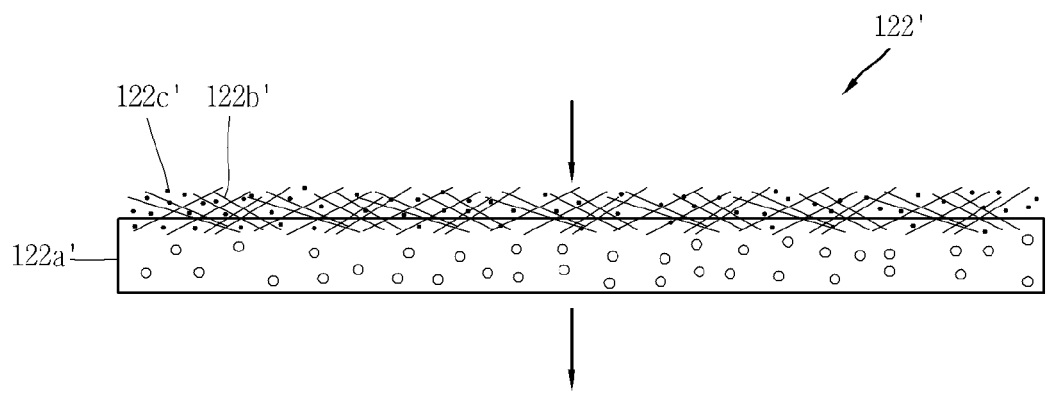
[Fig. 4a]
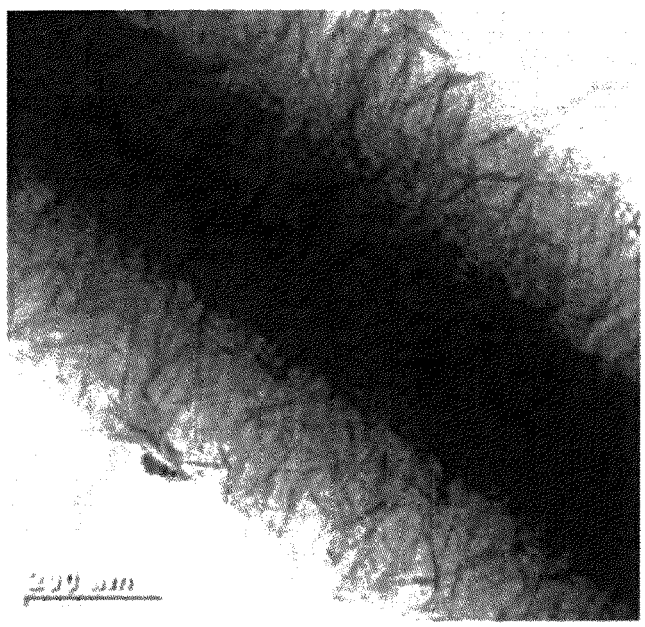

[Fig. 4b]
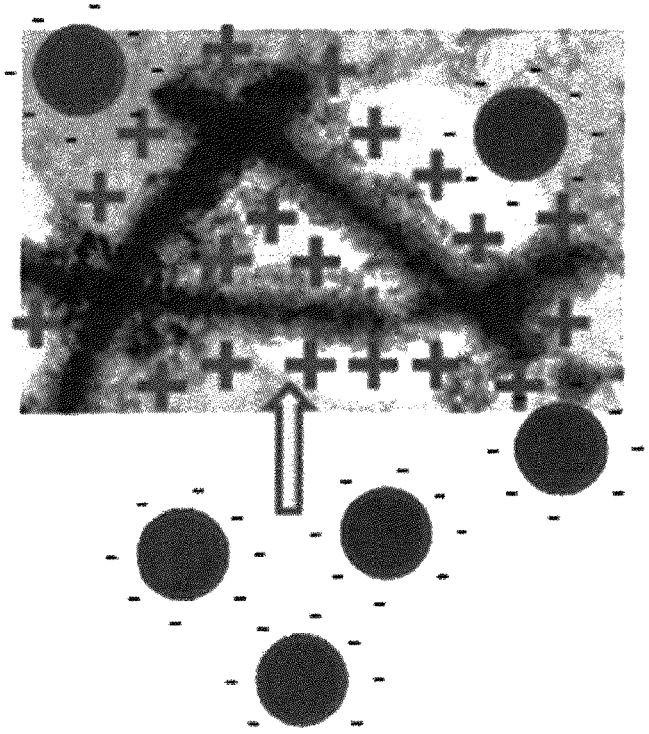
[Fig. 5]
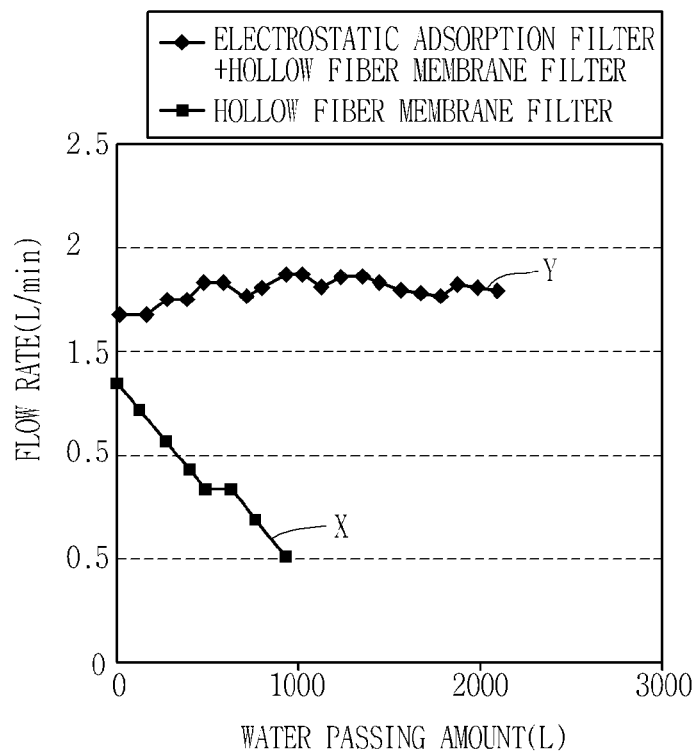

[Fig. 6]
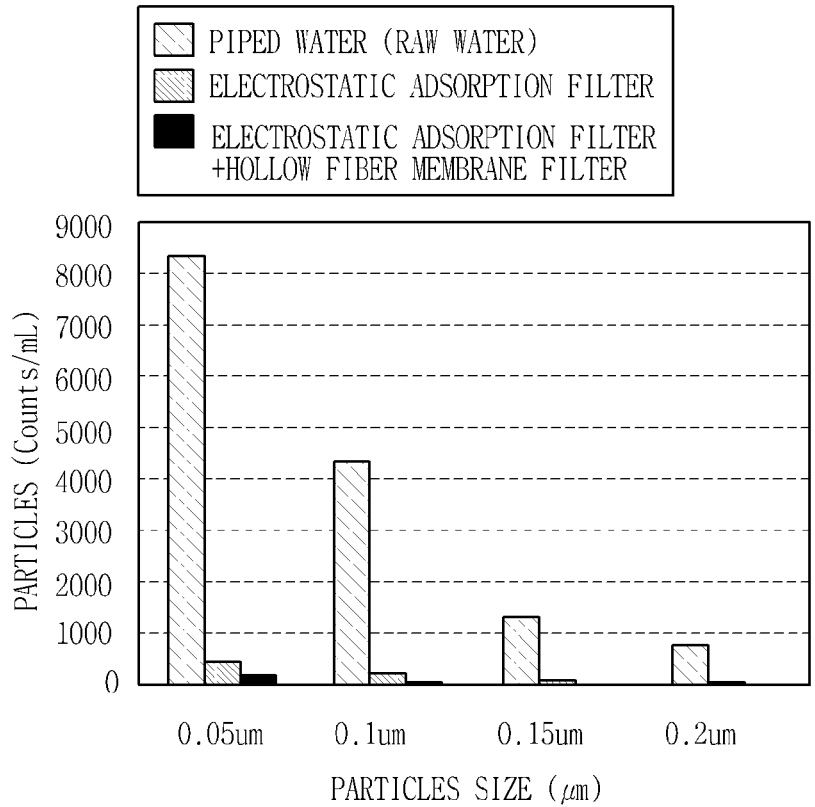
[Fig. 7]
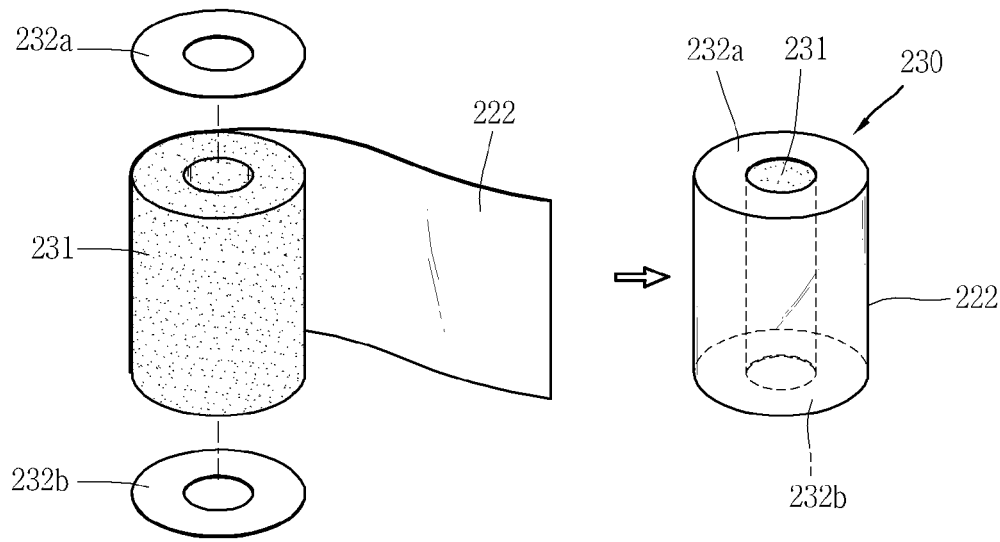

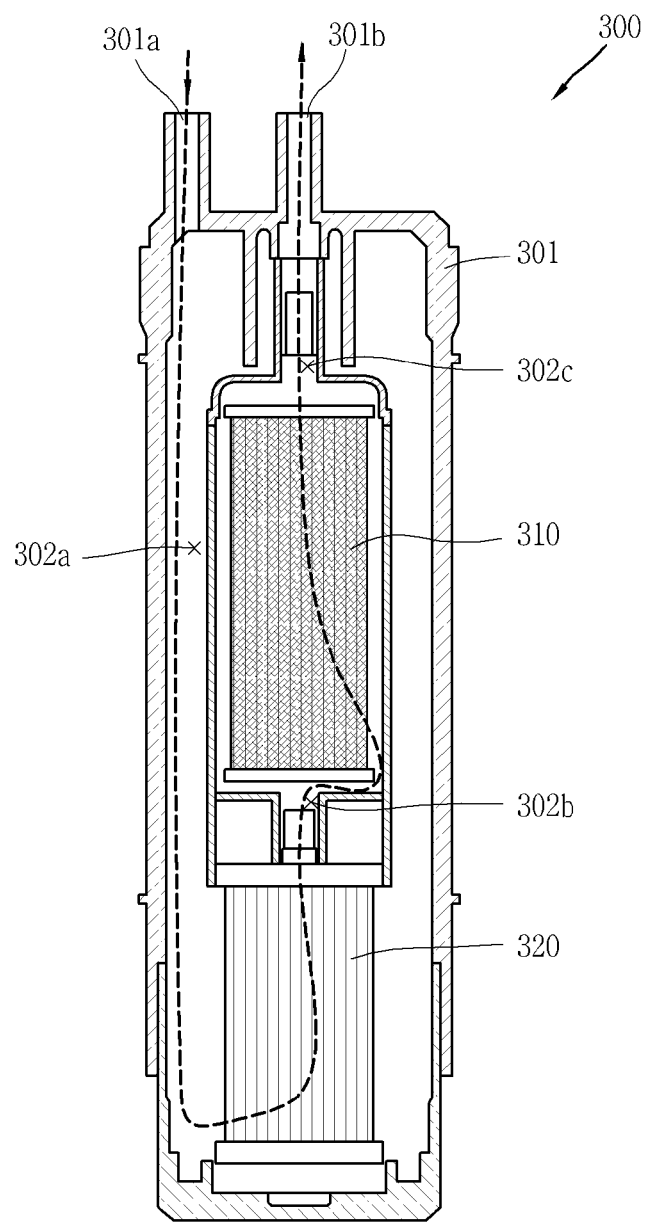
[Fig. 8]

[Fig. 9]
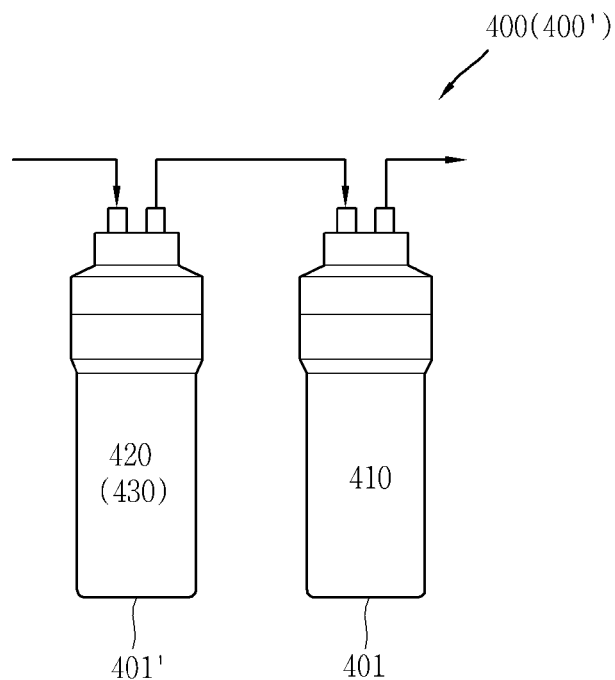
[Fig. 10]
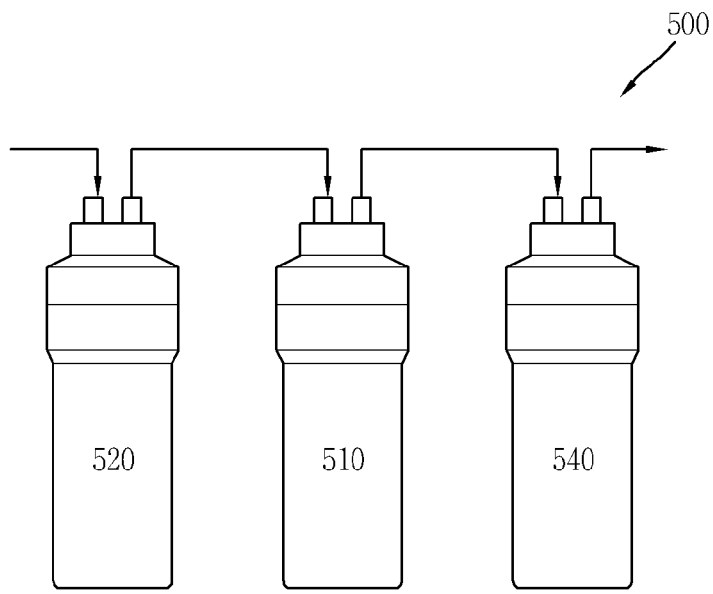

[Fig. 11]
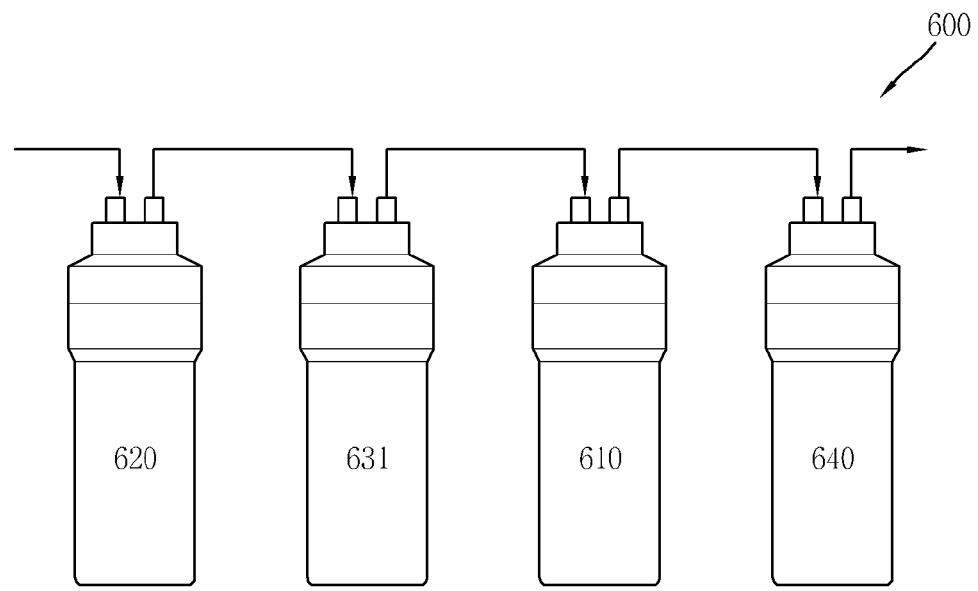

FILTER SYSTEM

CROSS-REFERENCE TO RELATED PATENT APPLICATIONS

This application is a U.S. National Stage Application under 35 U.S.C. § 371 of PCT Application No. PCT/KR2015/007336, filed Jul. 15, 2015, which claims priority to Korean Patent Application No. 10-2014-0093466, filed Jul. 23, 2014, whose entire disclosures are hereby incorporated by reference.

TECHNICAL FIELD

The present disclosure relates to a filter system that filters viruses existing in raw water to provide purified water.

BACKGROUND ART

Various filters are used for a filter system which is to purify water. Representative examples of the filters include a reverse osmosis membrane filter and a hollow fiber membrane filter.

The reverse osmosis membrane filter refers to a filter that reversely uses osmosis phenomenon. In a heavily doped solution and a lightly doped solution, which are separated from each other by a semi-permeable membrane, water is moved from the lightly doped solution to the heavily doped solution by naturally passing through the semi-permeable membrane. This phenomenon will be referred to as osmosis phenomenon, and at this time, a water level difference between the heavily doped solution and the lightly doped solution will be referred to as an osmotic pressure. If a pressure more than the osmotic pressure is given to the heavily doped solution, water is moved from the heavily doped solution to the lightly doped solution by passing through the semi-permeable membrane on the contrary to the natural phenomenon. This phenomenon will be referred to as reverse osmosis phenomenon, and at this time, a water level difference between the lightly doped solution and the heavily doped solution will be referred to as a reverse osmotic pressure. The reverse osmosis membrane filter is comprised to purify water by allowing water molecules only to pass through the semi-permeable membrane.

The hollow filter membrane filter is based on a thread-like filter of which center portion is empty, such as a bamboo. Pores are formed in the hollow filter membrane filter to filter target materials to be removed, which are mixed with water, and pass through water molecules. If water passes through the hollow filter membrane filter by using a water pressure, target materials to be removed, which are greater than the pores, fail to pass through the pores, and the water molecules smaller than the pores may pass through the hollow filter membrane filter. The hollow filter membrane filter is comprised to purify raw water by using the principle described as above. However, it is known that the hollow filter membrane filter fails to filter finer materials as compared with the reverse osmosis membrane filter.

Viruses of target materials to be removed from the raw water are formed at a fine size invisible to the naked eye. Particularly, if viruses, such as Noro viruses, which adversely affect a human's body, are contained in drinking water, such viruses cause a stomachache, whereby it is essentially required to remove the viruses from the filter system. However, since the viruses are formed at a fine size, it is general that the reverse osmosis membrane filter is more effective to remove fine materials than the hollow fiber membrane filter. Therefore, the reverse osmosis membrane filter has been generally used to remove viruses from raw water.

However, the applicant has devised a hollow fiber membrane, which may remove viruses, through studies and development of the hollow fiber membrane. Since the hollow fiber membrane, which may remove viruses, has pores of which sizes are smaller than those of the viruses, a problem has been raised in that a discharge capacity is rapidly reduced due to nanoparticles existing in water with the passage of time.

Therefore, a filter system, which may solve the problem that a discharge capacity is rapidly reduced due to nanoparticles when a hollow fiber membrane for removing viruses is used, may be considered.

DISCLOSURE OF INVENTION

Technical Problem

An object of the present invention is to provide a filter system comprised to avoid a rapid reduction of a discharge capacity, which occurs when a hollow fiber membrane having pores of which sizes may remove viruses is applied to a filter.

Another aspect of the detailed description is to provide a filter system that may remove a factor, which makes an exchange cycle of a hollow fiber membrane be short.

Other aspect of the detailed description is to provide a filter system that may be applied to various stages by using an electrostatic adsorption filter and a hollow fiber filter.

Solution to Problem

To achieve these and other advantages and in accordance with the purpose of the present invention, as embodied and broadly described herein, there is provided a filter system, including: a hollow fiber membrane filter having pores; and an electrostatic adsorption filter partially or wholly having positive charges to be ion adsorbed with nanoparticles of negative charges by an electrostatic attraction, the nanoparticles which exist in water, and the electrostatic adsorption filter configured to remove in advance the nanoparticles from the water to be supplied to the hollow fiber membrane filter, to prevent a water passing amount of the hollow fiber membrane filter from being rapidly reduced.

According to one embodiment of the present invention, each of the pores may be formed at a size smaller than 25 nm to remove viruses of an average size of 25 nm or more from water.

According to another embodiment of the present invention, the electrostatic adsorption filter may include a hollow portion forming a flow path of the water to supply the water having the nanoparticles removed therefrom, to the hollow fiber membrane filter; and an ion adsorption portion formed to surround the hollow portion to allow the water to pass through the ion adsorption portion and flow to the hollow portion, and forming a pleated outer surface around the hollow portion to increase a surface area which is in contact with the water.

As an example, the ion adsorption portion may include a non-woven fabric support; glass fibers attached to a surface of the non-woven fabric support; and an ion adsorption material formed on a surface of the glass fibers by grafting, providing positive charges to be ion adsorbed with the nanoparticles of negative charges existing in the water passing through the non-woven fabric support.

As another example, the ion adsorption portion may include a non-woven fabric support; fibrillate celluloses attached to a surface of the non-woven fabric support; and an ion adsorption material formed on a surface of the celluloses by grafting, providing positive charges to be ion adsorbed with the nanoparticles of negative charges existing in the water passing through the non-woven fabric support.

The ion adsorption material may include alumina, the alumina being dissociated into a positive ion of $AlO^+$ and a negative ion of $OH^-$ in the water and providing positive charges required for ion adsorption by using the positive ion of $AlO^+$.

According to still another embodiment of the present invention, the filter system may further comprise a housing for accommodating therein the hollow fiber membrane filter and the electrostatic adsorption filter to form a single module, wherein an inner flow path of the housing includes a raw water supply flow path for flowing raw water to the electrostatic adsorption filter; a connection flow path connected from the electrostatic adsorption filter to the outer surface of the hollow fiber membrane filter to flow the water having the nanoparticles primarily removed therefrom while passing through the electrostatic adsorption filter, to the hollow fiber membrane filter; and a discharge flow path flowing the water having viruses secondarily removed therefrom while passing through the hollow fiber membrane filter, to the outside of the housing.

According to further still another embodiment of the present invention, the filter system may further comprise a first housing for accommodating therein the hollow fiber membrane filter and a second housing for accommodating therein the electrostatic adsorption filter, whereby the hollow fiber membrane filter and the electrostatic adsorption filter are respectively built in their housings.

According to further still another embodiment of the present invention, the filter system may further comprise a carbon block filter comprised to remove residual chlorine remaining in the water by allowing the water to pass through a carbon block, wherein the carbon block filter is arranged to purify at least one of water having the nanoparticles removed therefrom while passing through the electrostatic adsorption filter, and water having viruses removed therefrom while passing through the hollow fiber membrane filter.

The carbon block filter may surround an outer surface of the carbon block to remove in advance the nanoparticles from the water to be supplied to the carbon block.

The carbon block filter may include an adsorption material to additionally remove heavy metals or organic compounds, and wherein the adsorption material forms the carbon block filter by being mixed with a raw material of the carbon block together with a binder and by undergoing a compression molding process (pressing).

Advantageous Effects of Invention

According to the present invention comprised as above, the nanoparticles, which cause a reduction of a flow rate of the hollow fiber membrane filter for removing viruses, may be removed in advance using the electrostatic adsorption filter in accordance with a size exclusion mechanism. Therefore, the nanoparticles existing in the water are removed in advance prior to passing through the hollow fiber membrane filter, whereby the flow rate of the hollow fiber membrane filter may be prevented from being reduced.

Also, according to the present invention, viruses may be removed by organic combination of the electrostatic adsorption filter and the hollow fiber membrane filter and it is not necessary to early exchange the filter with another one, whereby performance of the filter system may be improved.

Also, according to the present invention, the filter system includes the electrostatic adsorption filter and the hollow fiber membrane filter as essential elements, and may be formed in a single stage or enlarged to multi-stages if necessary.

BRIEF DESCRIPTION OF DRAWINGS

FIG. 1 is a flow chart illustrating a filter system according to one embodiment of the present invention;

FIG. 2a is a perspective view illustrating a hollow fiber membrane filter applied to a filter system according to the present invention;

FIG. 2b is an enlarged photo of a hollow fiber membrane;

FIG. 3a is a perspective view illustrating an electrostatic adsorption filter applied to a filter system according to the present invention;

FIG. 3b is a conceptual view illustrating a detailed configuration of an ion adsorption portion;

FIG. 3c is another conceptual view illustrating a detailed configuration of an ion adsorption portion;

FIG. 4a is a photo illustrating an ion adsorption portion shown in FIG. 3b;

FIG. 4b is a conceptual view illustrating a mechanism of nanoparticles ion-adsorbed to an ion adsorption portion of FIG. 4a;

FIG. 5 is a graph illustrating an effect of preventing a discharge capacity from being reduced by application of an electrostatic adsorption filter;

FIG. 6 is a graph illustrating an effect of nanoparticles removed by application of an electrostatic adsorption filter;

FIG. 7 is a conceptual view illustrating that an ion adsorption portion is coupled to a carbon block;

FIG. 8 is a cross-sectional view illustrating that a hollow fiber membrane filter and an electrostatic adsorption filter are built in a single housing;

FIG. 9 is a conceptual view illustrating that a hollow fiber membrane filter and an electrostatic adsorption filter are respectively built in their respective housings;

FIG. 10 is a conceptual view illustrating that a filter system is enlarged to three stages; and FIG. 11 is a conceptual view illustrating that a filter system is enlarged to four stages.

BEST MODE FOR CARRYING OUT THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated. It is to be understood that the singular expression used in this specification includes the plural expression unless defined differently on the context.

It will be understood that, although the terms "first", "second", etc. may be used herein to describe various elements, these elements should not be limited by these terms. These terms are only used to distinguish one element from another.

In this specification, it is to be understood that the terms such as "include" and "has" are intended to designate that features, numbers, steps, operations, elements, parts, or their combination, which are disclosed in the specification, exist, and are intended not to previously exclude the presence or optional possibility of one or more other features, numbers, steps, operations, elements, parts, or their combinations.

FIG. 1 is a flow chart illustrating a filter system 100 according to one embodiment of the present invention.

The filter system 100 includes a hollow fiber membrane filter 110 and an electrostatic adsorption filter 120. In order to purify raw water or embody a system (water purifier) for purifying raw water as a product, elements more than those shown in FIG. 1 will be required. However, essential elements related to technical spirits of the present invention are only shown in FIG. 1, and the other elements are omitted.

The hollow fiber membrane filter 110 is comprised to remove viruses. The hollow fiber membrane filter 110 is provided with pores having an average size smaller than that of viruses to remove viruses existing in water.

The average size of the pore provided in the hollow fiber membrane filter according to the related art was in the range of 100 nm, approximately. However, since the average size of viruses is in the range of 25 nm to 27 nm, the hollow fiber membrane filter of the related art cannot remove the viruses. The reason why that the hollow fiber membrane filter of the related art has pores greater than viruses is that the function of the hollow fiber membrane filter of the related art has no relation to removal of viruses.

Unlike the hollow fiber membrane filter of the related art, the hollow fiber membrane filter 110 of the present invention is intended to remove viruses. To this end, the hollow fiber membrane filter 110 suggested in the present invention has pores having an average size smaller than that of viruses to remove the viruses. Since the average size of viruses to be removed from water is in the range of 25 nm to 27 nm, the average size of the pores of the hollow fiber membrane filter 110 is formed at 25 nm or less. In order to obtain reliability in removing viruses, the average size of the pores of the hollow fiber membrane filter 110 is preferably formed at 20 nm, approximately.

The hollow fiber membrane filter 110 having pores of an average size smaller than about 25 nm may remove viruses existing in water in accordance with a size exclusion mechanism. In particular, it is advantageous in that the hollow fiber membrane filter 110 for removing viruses in accordance with the size exclusion mechanism may remove viruses regardless of kinds of raw water. A related art filter for removing viruses in another manner not the size exclusion mechanism has been suggested. However, the related art filter has a problem in that its performance is determined depending on conditions of raw water, such as pH, etc.

Since the hollow fiber membrane filter 110 of the present invention is based on the size exclusion mechanism, it is advantageous in that the hollow fiber membrane filter 110 is not affected by conditions of raw water. However, nanoparticles having a size of about 200 nm or less as well as viruses exist in raw water such as piped water. If the hollow fiber membrane filter 110 is allowed to pass through raw water to remove viruses from the raw water including nanoparticles, the pore of the hollow fiber membrane filter 110 is blocked by the nanoparticles in accordance with the passage of time. For this reason, a problem occurs in that a discharge capacity of the hollow fiber membrane filter 110 is rapidly reduced.

In the hollow fiber membrane filter of the related art, which has pores having an average size of about 100 nm, the phenomenon that the discharge capacity is rapidly reduced by the nanoparticles has not been found significantly. Therefore, the problem of the discharge capacity reduced by the nanoparticles in the hollow fiber membrane filter of the related art did not affect performance of the filter system.

However, in the filter system 100 that uses the hollow fiber membrane filter 110 having pores of an average size smaller than about 25 nm as in the present invention, the discharge capacity reduced by the nanoparticles greatly affects performance of the filter system.

At present, filters of a filter system which are generally used are exchanged with another ones periodically. However, the discharge capacity reduced by the nanoparticles makes an exchange cycle of the hollow fiber membrane filter 110 be shorter. Also, the reduction of the discharge capacity causes reduction of the amount of purified water provided to users, the reduction of the discharge capacity acts as a factor, which makes quality of the filter system be evaluated at a low level, in view of the users.

The present invention suggests a filter system 100 that uses an electrostatic adsorption filter 120 and a hollow fiber membrane filter 110 together to solve the problem of the discharge capacity, which may be reduced by application of the hollow fiber membrane filter 110 having pores of which size may remove viruses.

The electrostatic adsorption filter 120 partially or wholly has positive charges to be ion-adsorbed with nanoparticles of negative charges by an electrostatic attraction, the nanoparticles which exist in water. Most of particle materials existing in water in the range of pH of drinking water have negative charges, and nanoparticles to be removed by the electrostatic adsorption filter 120 also have negative charges. Therefore, the nanoparticles may be ion-adsorbed with the positive charges by the electrostatic attraction.

The electrostatic adsorption filter 120 removes in advance the nanoparticles from water to be supplied to the hollow fiber membrane filter 110, thereby preventing the discharge capacity of the hollow fiber membrane filter 110 from being rapidly reduced by the nanoparticles. In view of the pass through order of water, the electrostatic adsorption filter 120 is arranged prior to the hollow fiber membrane filter 110. Therefore, water purified by the filter system 100 primarily passes through the electrostatic adsorption filter 120 and secondarily passes through the hollow fiber membrane filter 110.

Since the electrostatic adsorption filter 120 removes in advance the nanoparticles from water to be supplied to the hollow fiber membrane filter 110, viruses may exist in water B that has passed through the electrostatic adsorption filter 120. However, the nanoparticles that cause the reduction of the discharge capacity are removed by the electrostatic adsorption filter 120. Therefore, if water B that has passed through the electrostatic adsorption filter 120 is supplied to the hollow fiber membrane filter 110, the reduction of the discharge capacity may be prevented from occurring in the hollow fiber membrane filter 110.

Water C purified in the filter system 100 may be divided into raw water A, primary purified water B, and secondary purified water C. The raw water A indicates water prior to passing through the filter system 100, and means water which is not purified at all. For example, the raw water A includes piped water.

The primary water B indicates water that has passed through the electrostatic adsorption filter 120. If the raw water A passes through the electrostatic adsorption filter 120, nanoparticles are removed from the raw water A, and the raw water A becomes the primary purified water B. The primary purified water B may be understood as water which nanoparticles are removed from the raw water A. Viruses may exist in the primary purified water B.

The secondary purified water C indicates water that has passed through the electrostatic adsorption filter 120 and the hollow fiber membrane filter 110 in due order. If the primary purified water B passes through the hollow fiber membrane filter 110, viruses are removed from the primary purified water B, and the primary purified water B becomes the secondary purified water C. The secondary purified water C may be understood as water which viruses are removed from the primary purified water B. Since the nanoparticles are removed by the electrostatic adsorption filter 120 and the viruses are removed by the hollow fiber membrane filter 110, the nanoparticles and viruses little exist in the secondary purified water C.

According to the present invention, the viruses existing in the raw water A may be removed by the hollow fiber membrane filter 110. Also, the nanoparticles that cause the reduction of the discharge capacity may be removed by the electrostatic adsorption filter 120. In particular, the electrostatic adsorption filter 120 is comprised to remove in advance the nanoparticles from water to be supplied to the hollow fiber membrane filter 110 without removing the nanoparticles from the water that has passed through the hollow fiber membrane filter 110. Therefore, according to the present invention, the size exclusion mechanism may be used to remove viruses and prevent the discharge capacity of the hollow fiber membrane filter 110 from being reduced.

Hereinafter, a detailed structure of the hollow fiber membrane filter 110 and the electrostatic adsorption filter 120 will be described.

FIG. 2a is a perspective view illustrating a hollow fiber membrane filter 110 applied to a filter system 100 (see FIG. 1) according to the present invention, and FIG. 2b is an enlarged photo of a hollow fiber membrane.

The hollow fiber membrane filter 110 of FIG. 2a is formed by grouping a bundle of hollow fiber membranes 112 of FIG. 2b. A lower end of the hollow fiber membrane filter 110 is potted by a resin such as polyurethane to block a flow of water, and its upper end spurts out water toward the center of the hollow fiber membranes as the resin is cut after potting. The hollow fiber membrane 112 means a thread-like membrane of which center portion is empty. The hollow fiber membrane 112 is provided with pores (not shown), each of which has a size of 25 nm or less to remove viruses. It is preferable that the pores are formed to have an average size of about 20 nm to remove viruses more clearly.

A flow path 111, which may discharge water, is formed at a center portion of the hollow fiber membrane filter 110. Water is supplied into an outer surface of the hollow fiber membrane filter 110. Viruses existing in the water fail to pass through the pores while the water is passing through the hollow fiber membrane filter 110, whereby the viruses are removed from the water. Arrows in FIG. 2a represent flows of water. The water is discharged out through the flow path 111 formed at the center portion of the hollow fiber membrane filter 110.

FIG. 3a is a perspective view illustrating an electrostatic adsorption filter 120 applied to a filter system 100 (see FIG. 1) according to the present invention.

The electrostatic adsorption filter 120 includes a hollow portion 121 and an ion adsorption portion 122.

The hollow portion 121 forms a flow path that may discharge out water. For example, the hollow portion 121 may form a flow path of water, which provides water having the nanoparticles removed therefrom, to the hollow fiber membrane filter 110.

The ion adsorption portion 122 is formed around the hollow portion 121 to allow water to flow to the hollow portion 121. The water is supplied into the hollow portion 121 through the ion adsorption portion 122 formed on the outer surface of the electrostatic adsorption filter 120. While the water is passing through the ion adsorption portion 122, nanoparticles of negative charges existing in the water are adsorbed to the ion adsorption portion 122 by an electrostatic attraction. The water having the nanoparticles removed therefrom is discharged out through the flow path formed in the hollow portion 121. Arrows of FIG. 3a represent flows of water.

The ion adsorption portion 122 forms a pleated outer surface around the hollow portion 121 to increase a surface area which is in contact with the water. Since the ion adsorption portion 122 removes the nanoparticles which exist in the water by an electrostatic attraction, the ion adsorption portion 122 may remove more nanoparticles if the ion adsorption portion 122 has more opportunities of contact with the nanoparticles. Therefore, if the ion adsorption portion 122 forms a pleated outer surface as shown in FIG. 3a, the surface area which is in contact with the water is increased. The number of pleats (or the number of mountains) may be controlled to control the surface area. The ion adsorption portion 122 having a pleated outer surface may remove more nanoparticles as compared with a flat outer surface.

FIG. 3b is a conceptual view illustrating a detailed configuration of an ion adsorption portion 122.

The ion adsorption portion 122 is comprised to remove nanoparticles of negative charges, which exist in water, by using an electrostatic attraction. The ion adsorption portion 122 includes a non-woven fabric support 122a, glass fibers 122b and an ion adsorption material 122c.

The non-woven fabric support 122a forms an outer surface of the electrostatic adsorption filter 120. In particular, the non-woven fabric support 122a is made in a shape of a sheet, and may form a pleated outer surface of the electrostatic adsorption filter 120 through processing. The non-woven fabric support 122a supports the glass fibers 122b. The non-woven fabric support 122a is provided with pores through which water passes.

The glass fibers 122b are attached to a surface of the non-woven fabric support 122a. The glass fiber 122b is to fix the ion adsorption material 122c. The fibrillate glass fibers 122b are randomly arranged on the surface of the non-woven fabric support 122a and get tangled up together. A gap of about 2 μm to 3 μm may be formed between the glass fibers 122b, and water may pass through the gap. Particles greater than the gap may be removed from the water in accordance with the size exclusion mechanism.

The ion adsorption material 122c is formed by grafting on the surface of the glass fibers 122b. Grafting means a process for fixing the ion adsorption material 122c to the surface of the glass fibers 122b, and includes a step of fixing the ion adsorption material 122c to the glass fibers 122b through physical rolling. The ion adsorption material 122c provides positive charges to be ion adsorbed with nanoparticles of negative charges existing in the water that passes through the felt.

The ion adsorption material 122c includes alumina AlOOH. AlOOH is dissociated into a positive ion of $AlO^+$ and a negative ion of $OH^-$ in the water. The ion adsorption material 122c provides positive charges required for ion adsorption by using the positive ion of $AlO^+$. The positive charges may have a size of about +80 mV.

The nanoparticles having negative charges may be ion-adsorbed with the ion adsorption portion 122 by the positive charges provided by the ion adsorption material 122c.

FIG. 3c is another conceptual view illustrating a detailed configuration of an ion adsorption portion 122'.

A non-woven fabric support 122a' is the same as that described in FIG. 3b. Therefore, a description of the non-woven fabric support 122a' will be replaced with the description of FIG. 3b.

The ion adsorption portion 122' includes celluloses 122b' instead of the glass fibers 122b used in FIG. 3b. The celluloses 122b' are attached to a surface of the non-woven fabric support 122a'. The celluloses 122b' are also intended to fix an ion adsorption material 122c'. The fibrillate celluloses 122b' are randomly arranged on the surface of the non-woven fabric support 122a' and get tangled up together. A gap of about 0.5 μm to 1 μm may be formed between the celluloses 122b', and water may pass through the gap. Particles greater than the gap may be removed from the water in accordance with the size exclusion mechanism.

The celluloses 122b' have several advantages as compared with the glass fibers 122b (see FIG. 3b).

First of all, the celluloses 122b' are not harmful to a human body. Since the electrostatic adsorption filter 120 (see FIG. 3a) is an element of the filter system 100 (see FIG. 1) which forms drinking water, the celluloses should not be harmful to a human body. Since harmlessness of the celluloses 122b' is approved as compared with the glass fibers 122b (see FIG. 3b), the celluloses 122b' are suitable for the element of the electrostatic adsorption filter 120 (see FIG. 1) for processing drinking water.

Also, since a gap smaller than that of the glass fibers 122b (see FIG. 3b) is formed between the celluloses 122b', performance for removing impurities existing in water in accordance with the size exclusion mechanism may be more improved than that of the glass fibers 122b (see FIG. 3b).

The ion adsorption material 122c' is formed by grafting on the surface of the celluloses 122b'. A description of the ion adsorption material 122c' will be replaced with the description of FIG. 3b.

Arrows in FIG. 3b and FIG. 3c represent flow directions of water.

FIG. 4a is a photo illustrating an ion adsorption portion 122 shown in FIG. 3b. In the photo, bright color portions at a left lower end and a right upper end correspond to the non-woven fabric support, and dark colored fibers from a left upper end to a right lower end correspond to the glass fibers. The particles arranged on the surface of the glass fibers correspond to alumina.

FIG. 4b is a conceptual view illustrating a mechanism of nanoparticles ion-adsorbed to an ion adsorption portion of FIG. 4a.

Referring to FIG. 4a, three glass fibers are arranged to get tangled together. A triangular gap is formed among the three glass fibers, and water may pass through the gap. Alumina fixed to the surface of the glass fibers provides positive ions required for ion adsorption. Therefore, positive charges are generated on the surface of the glass fibers. Since the nanoparticles existing in the water have negative charges, the nanoparticles are ion-adsorbed with the positive ions existing on the surface of the glass fibers while water is passing through the glass fibers. An arrow in FIG. 4b represents a flow of water.

Hereinafter, the effect of removal of the nanoparticles and the effect of preventing the discharge capacity from being reduced in accordance with application of the electrostatic adsorption filter 120 (see FIG. 1) together with the hollow fiber membrane filter 110 (see FIG. 1) will be described with reference to graphs and Tables.

FIG. 5 is a graph illustrating an effect of preventing a discharge capacity from being reduced by application of an electrostatic adsorption filter.

A horizontal axis means an accumulated discharge capacity (unit L), and a vertical axis means a flow rate (unit L/min). A reduction of the flow rate according to increase of the accumulated discharge capacity means that the pores of the hollow fiber membrane filter are blocked by the nanoparticles, and means that exchange cycle of the hollow fiber membrane filter is short.

In FIG. 5, a line X is the result of the hollow fiber membrane filter only without the electrostatic adsorption filter, and a line Y is the result of the electrostatic adsorption filter and the hollow fiber membrane filter.

First of all, referring to the case where water is purified using the hollow fiber membrane filter only without the electrostatic adsorption filter, it is noted that the flow rate is reduced continuously in accordance with the increase of the accumulated discharge capacity. An initial flow rate is about 1.4 L/min, whereas a flow rate is only 0.5 L/min when the accumulated discharge capacity reaches about 1000 L. Therefore, if water is purified using the hollow fiber membrane filter only without the electrostatic adsorption filter, the pores of the hollow fiber membrane filter are blocked by the nanoparticles, and the hollow fiber membrane filter should early be exchanged with another one.

Next, referring to the case where the electrostatic adsorption filter and the hollow fiber membrane filter are used together in the line Y, it is noted that the initial flow rate is maintained as it is even though the accumulated discharge capacity is increased. The flow rate is little changed even though the accumulated discharge capacity reaches about 2000 L. If the electrostatic adsorption filter and the hollow fiber membrane filter are used together, since the nanoparticles are removed by the electrostatic adsorption filter, the pores of the hollow fiber membrane filter may be prevented from being blocked, and the flow rate (discharge capacity) of the hollow fiber membrane filter may be prevented from being reduced.

FIG. 6 is a graph illustrating an effect of nanoparticles removed by application of an electrostatic adsorption filter 120 (see FIG. 1).

A horizontal axis means a size (unit μm) of nanoparticles, and a vertical axis means the number (counts/ml) of nanoparticles per unit flow rate. The number of nanoparticles per unit flow rate was measured by being divided into particles of 0.05 μm or less, particles of 0.1 μm or less, and particles of 0.2 μm or less. The case where piped water (raw water) and the electrostatic adsorption filter are only used was illustrated in Table 1 as compared with the case where the electrostatic adsorption filter and the hollow fiber membrane filter are used together.

TABLE 1

| size of nanoparticles | The number of nanoparticles per unit flow rate | | | |
|---|---|---|---|---|
| | 0.05 μm | 0.1 μm | 0.15 μm | 0.2 μm |
| 1. Piped water | 8402 | 4395 | 1353 | 757 |
| 2. Electrostatic adsorption filter | 434 | 204 | 68 | 41 |
| 3. Electrostatic adsorption filter + Hollow fiber membrane filter | 152 | 58 | 17 | 20 |

A plurality of nanoparticles exist in piped water per size. In particular, most of the piped water is filled with nanoparticles of 0.05 μm or less and nanoparticles of 0.1 μm or less. As can be seen in the graph of FIG. 6 and Table 1, the electrostatic adsorption filter may remove 90% or more of the nanoparticles existing in the piped water. It is noted from FIG. 6 and Table 1 that the electrostatic adsorption filter may remove the nanoparticles, and the reduction of the discharge capacity of the hollow fiber membrane filter, which is caused by the nanoparticles, is mitigated.

Hereinafter, a filter system formed by modification or application of the electrostatic adsorption filter and the hollow fiber membrane filter, which are described as above, will be described.

FIG. 7 is a conceptual view illustrating that an ion adsorption portion 222 is coupled to a carbon block 231.

The filter system (not shown) may further include carbon block filters 231, 232a and 232b comprised to remove residual chlorine remaining in water by allowing the water to pass through the carbon block 231. The carbon block filters 231, 232a and 232b are formed in such a manner that covers 232a and 232b are respectively coupled to an upper end and a lower end of the carbon block 231. A hollow portion may be formed at a center portion of the carbon block 231, and the covers 232a and 232b are provided with holes formed to correspond to the hollow portion of the carbon block 231.

The ion adsorption portion 222 may be coupled with the carbon block 231 to form a complex filter 230. The ion adsorption portion 222 surrounds the carbon block 231 to previously provide nanoparticles from water which will be supplied by the carbon block 231. Preferably, the ion adsorption portion 222 is formed as one layer to prevent the flow rate from being reduced. Water is supplied into an outer surface of the complex filter 230, and the nanoparticles existing in the water are removed by the ion adsorption portion 222. The water having the nanoparticles removed therefrom passes through the carbon block 231, and the residual chlorine remaining in the water is removed by the carbon block 231. Also, heavy metals or organic compounds existing in the water may additionally be removed by an adsorption material provided in the carbon block 231. The filter system 100 (see FIG. 1) may be comprised of the complex filter 230 and the hollow fiber membrane filter 110 (see FIG. 1) only.

A carbon block filter (not shown) or the complex filter 230 may be provided with an adsorption material (not shown) to additionally remove the heavy metals or organic compounds. The adsorption material may be mixed with the material of the carbon block 231 together with a binder (not shown) and undergo a compression molding process (pressing), whereby the carbon block filter may be formed.

The adsorption material includes hydrated iron and silica material, for example. The hydrated iron is comprised to remove arsenic (As) existing in the water, and the silica material is comprised to remove lead existing in the water. Also, the adsorption material may include a material that removes chloroform which is a main organic compound existing in the water.

FIG. 8 is a cross-sectional view illustrating that a hollow fiber membrane filter 310 and an electrostatic adsorption filter 320 are built in a single housing 310.

The filter system 300 may be formed as a single stage filter which is a combined type of the electrostatic adsorption filter 320 and the hollow fiber membrane filter 310. The filter system 300 includes the hollow fiber membrane filter 310, the electrostatic adsorption filter 320, and the housing 310.

The electrostatic adsorption filter 320 and the hollow fiber membrane filter 310 are arranged inside the housing 310. The electrostatic adsorption filter 320 and the hollow fiber membrane filter 310 may be deposited inside the housing 310 in due order as shown in FIG. 8. The housing 310 is provided with an inlet 301a forming an inlet flow path of raw water, and an outlet 301b forming a flow path for discharging purified water.

The inner flow path of the housing 301 includes a raw water supply flow path 302a, a connection flow path 302b, and a discharge flow path 302c.

The raw water supply flow path 302a is connected from the inlet 301a to the outer surface of the electrostatic adsorption filter 320 to flow the raw water to the electrostatic adsorption filter 320. The raw water supplied through the inlet 301a of the housing 301 is supplied to the outer surface of the electrostatic adsorption filter 320 along the raw water supply flow path 302a. The water supplied to the electrostatic adsorption filter 320 passes through the ion adsorption portion 122 (see FIG. 3a) arranged on the outer surface of the electrostatic adsorption filter 320 and flows to the hollow portion 121 (see FIG. 3a) of the electrostatic adsorption filter 320.

The connection flow path 302b is connected from the electrostatic adsorption filter 320 to the outer surface of the hollow fiber membrane filter 310 to flow the water having the nanoparticles primarily removed therefrom while passing through the electrostatic adsorption filter 320, to the hollow fiber membrane filter 310. The water discharged through the hollow portion 121 (see FIG. 3a) of the electrostatic adsorption filter 320 flows to the outer surface of the hollow fiber membrane filter 310 along the connection flow path 302b. Viruses existing in the water are removed by the hollow fiber membrane filter 310.

The discharge flow path 302c is connected to the outlet 301b to flow the water having viruses secondarily removed therefrom while passing through the hollow fiber membrane filter 310, to the outside of the housing 301. The water supplied to the inlet 301a of the housing 301 is discharge to the outlet 301b of the housing 301 by passing through the raw water supply flow path 302a, the electrostatic adsorption filter 320, the connection flow path 302b, the hollow fiber membrane filter 310 and the discharge flow path 302c. In this process, the nanoparticles and viruses existing in the water are respectively removed by the electrostatic adsorption filter 320 and the hollow fiber membrane filter 310 in due order.

If the electrostatic adsorption filter 320 and the hollow fiber membrane filter 310 are arranged in the single housing 301 and the raw water supply flow path 302a, the connection flow path 302b and the discharge flow path 302c are connected as described above, the filter system 300 may be formed as one module. The filter system 300 comprised as one module may reduce its size as compared with the filter system 300 that separately includes the electrostatic adsorption filter 320 and the hollow fiber membrane filter 310. Therefore, if the filter system 300 comprised as one module is used, a small sized water purifier may be obtained.

FIG. 9 is a conceptual view illustrating that a hollow fiber membrane filter 410 and an electrostatic adsorption filter 420 are respectively built in their respective housings 401 and 401'.

The filter system 400 includes a first housing 401 for accommodating therein the hollow fiber membrane filter 410 and a second housing 401' for accommodating therein the electrostatic adsorption filter 420, whereby the hollow fiber membrane filter 410 and the electrostatic adsorption filter 420 are respectively built in their respective housings 401 and 401'. The hollow fiber membrane filter 410 and the electrostatic adsorption filter 420 are formed as their respective modules. Water first passes through the electrostatic adsorption filter 420 and then passes through the hollow fiber membrane filter 410.

If the hollow fiber membrane filter 410 and the electrostatic adsorption filter 420 are formed as separate modules as shown in FIG. 9, the size of the modules is more increased than that of the single module described in FIG. 8. However, since the hollow fiber membrane filter 410 and the electrostatic adsorption filter 420 depend on their respective exchange cycle, it is advantageous in that it is not necessary to exchange both of the two filters 410 and 420 when any one of the two filters 410 and 420 fails to carry out its function.

As shown in FIG. 9, the filter system 400 may include the hollow fiber membrane filter 410 and the electrostatic adsorption filter 420. Also, the filter system 400' may include the complex filter 430 described in FIG. 7 and the hollow fiber membrane filter 410. The latter filter system 400' may additionally remove residual chlorine, heavy metals or organic compounds existing in the water as compared with the former filter system 400.

FIG. 10 is a conceptual view illustrating that a filter system 500 is enlarged to three stages.

The filter system 500 includes an electrostatic adsorption filter 520, a hollow fiber membrane filter 510, and a carbon block filter 540. The electrostatic adsorption filter 520, the hollow fiber membrane filter 510, and the carbon block filter 540 are formed as their respective modules. Functions of each of the electrostatic adsorption filter 520, the hollow fiber membrane filter 510 and the carbon block filter 540 will be replaced with the aforementioned description thereof.

Referring to FIG. 10, water is purified while passing through the electrostatic adsorption filter 520, the hollow fiber membrane filter 510, and the carbon block filter 540 in due order. The electrostatic adsorption filter 520 removes nanoparticles, the hollow fiber membrane filter 510 removes viruses, and the carbon block filter 540 removes residual chlorine. If the carbon block filter 540 includes an adsorption material, the carbon block filter 540 may additionally remove heave metals or organic compounds.

The carbon block filter 540 is arranged to purify at least one of water having the nanoparticles removed therefrom while passing through the electrostatic adsorption filter 520, and water having viruses removed therefrom while passing through the hollow fiber membrane filter 510. Therefore, the carbon block filter 540 may be moved from the rear side of the hollow fiber membrane filter 510 to the rear side of the electrostatic adsorption filter 520 as shown in FIG. 10. However, there is no change in the arrangement of the electrostatic adsorption filter 520 arranged prior to the hollow fiber membrane filter 510.

FIG. 11 is a conceptual view illustrating that a filter system 600 is enlarged to four stages.

The filter system 600 includes an electrostatic adsorption filter 620, a first carbon block filter 631, a hollow fiber membrane filter 610, and a second carbon block filter 640. At least one of the first carbon block filter 631 and the second carbon block filter 640 may include an adsorption material (not shown).

Referring to FIG. 11, water is purified while passing through the electrostatic adsorption filter 620, the first carbon block filter 631, the hollow fiber membrane filter 610, and the second carbon block filter 640 in due order. The electrostatic adsorption filter 620 removes nanoparticles, the hollow fiber membrane filter 610 removes viruses, and the first carbon block filter 631 and the second carbon block filter 640 remove residual chlorine. As at least one of the first carbon block filter 631 and the second carbon block filter 640 includes an adsorption material (not shown), whereby heavy metals or organic compounds may additionally be removed.

The order of the respective filters may be changed. However, there is no change in the arrangement of the electrostatic adsorption filter 620 arranged prior to the hollow fiber membrane filter 610. The filter system 600 includes the electrostatic adsorption filter 620 and the hollow fiber membrane filter 610 as essential elements, and may be enlarged to multi-stages.

According to the present invention, the nanoparticles, which cause the reduction of the flow rate of the hollow fiber membrane filter for removing viruses, may be removed in advance using the electrostatic adsorption filter in accordance with the size exclusion mechanism. Therefore, the nanoparticles existing in the water are previously removed prior to passing through the hollow fiber membrane filter, whereby the flow rate of the hollow fiber membrane filter may be prevented from being reduced.

The filter system described as above is not limited to the configurations and methods of the aforementioned embodiments, and all or some of the embodiments may be comprised selectively in combination so that various modifications may be made in the embodiments.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

INDUSTRIAL APPLICABILITY

The present invention may be used for various industrial fields such as water purifiers.

The invention claimed is:
1. A filter system comprising:
a hollow fiber membrane filter having pores; and
an electrostatic adsorption filter partially or wholly having positive charges to be ion adsorbed with nanoparticles of negative charges by an electrostatic attraction, the nanoparticles which exist in water, and the electrostatic adsorption filter configured to remove in advance the nanoparticles from the water to be supplied to the hollow fiber membrane filter, to prevent a water passing amount of the hollow fiber membrane filter from being rapidly reduced,
wherein the electrostatic adsorption filter includes:
a hollow portion forming a flow path of the water to supply the water having the nanoparticles removed therefrom, to the hollow fiber membrane filter; and
an ion adsorption portion formed to surround the hollow portion to allow the water to pass through the ion adsorption portion and flow to the hollow portion, and forming a pleated outer surface around the hollow portion to increase a surface area which is in contact with the water.

2. The filter system of claim 1, wherein each of the pores is formed at a size smaller than 25 nm to remove viruses of an average size of 25 nm or more from water.

3. The filter system of claim 1, wherein the ion adsorption portion includes:
a non-woven fabric support;
glass fibers attached to a surface of the non-woven fabric support; and
an ion adsorption material formed on a surface of the glass fibers by grafting, providing positive charges to be ion adsorbed with the nanoparticles of negative charges existing in the water passing through the non-woven fabric support.

4. The filter system of claim 1, wherein the ion adsorption portion includes:
a non-woven fabric support;
fibrillate celluloses attached to a surface of the non-woven fabric support; and
an ion adsorption material formed on a surface of the celluloses by grafting, providing positive charges to be ion adsorbed with the nanoparticles of negative charges existing in the water passing through the non-woven fabric support.

5. The filter system of claim 3, wherein the ion adsorption material includes alumina, the alumina being dissociated into a positive ion of $AlO^+$ and a negative ion of $OH^-$ in the water and providing positive charges required for ion adsorption by using the positive ion of $AlO^+$.

6. The filter system of claim 1, further comprising a housing for accommodating therein the hollow fiber membrane filter and the electrostatic adsorption filter to form a single module,
wherein an inner flow path of the housing includes:
a raw water supply flow path for flowing raw water to the electrostatic adsorption filter;
a connection flow path connected from the electrostatic adsorption filter to the outer surface of the hollow fiber membrane filter to flow the water having the nanoparticles primarily removed therefrom while passing through the electrostatic adsorption filter, to the hollow fiber membrane filter; and
a discharge flow path flowing the water having viruses secondarily removed therefrom while passing through the hollow fiber membrane filter, to the outside of the housing.

7. The filter system of claim 1, further comprising a first housing for accommodating therein the hollow fiber membrane filter and a second housing for accommodating therein the electrostatic adsorption filter, whereby the hollow fiber membrane filter and the electrostatic adsorption filter are respectively built in their housings.

8. The filter system of claim 1, further comprising a carbon block filter comprised to remove residual chlorine remaining in the water by allowing the water to pass through a carbon block, wherein the carbon block filter is arranged to purify at least one of water having the nanoparticles removed therefrom while passing through the electrostatic adsorption filter, and water having viruses removed therefrom while passing through the hollow fiber membrane filter.

9. The filter system of claim 8, wherein the carbon block filter surrounds an outer surface of the carbon block to remove in advance the nanoparticles from the water to be supplied to the carbon block.

10. The filter system of claim 8, wherein the carbon block filter includes an adsorption material to additionally remove heavy metals or organic compounds, and
wherein the adsorption material forms the carbon block filter by being mixed with a raw material of the carbon block together with a binder and by undergoing a compression molding process.

* * * * *